A. FAY.
APPARATUS FOR OPERATING UPON COMPOSITE SUBSTANCES.
APPLICATION FILED AUG. 30, 1915.
1,177,939.
Patented Apr. 4, 1916.
3 SHEETS—SHEET 1.
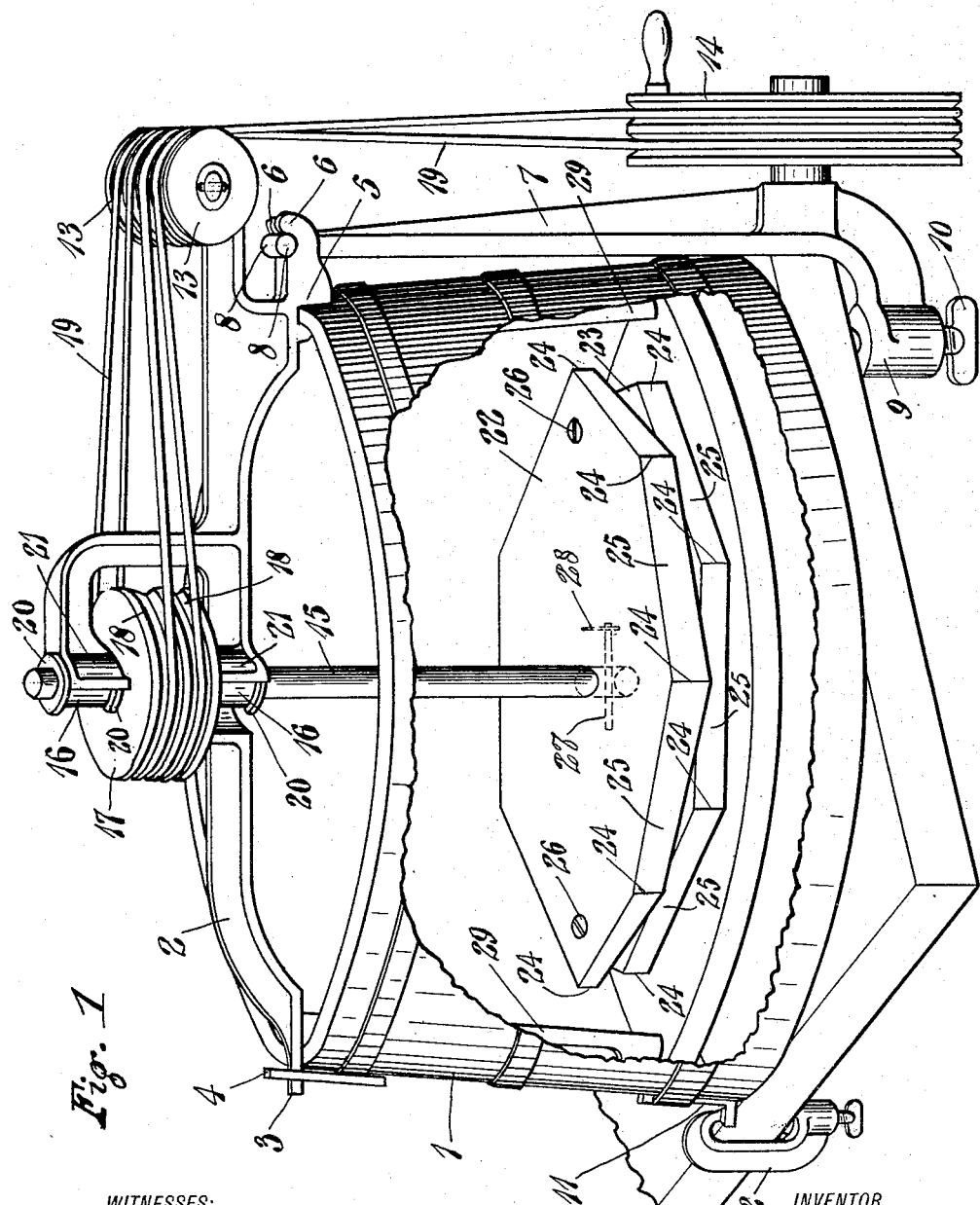
WITNESSES:
INVENTOR A. FAY.
APPARATUS FOR OPERATING UPON COMPOSITE SUBSTANCES.
APPLICATION FILED AUG. 30, 1915.
1,177,939.
Patented Apr. 4, 1916.
3 SHEETS—SHEET 2.
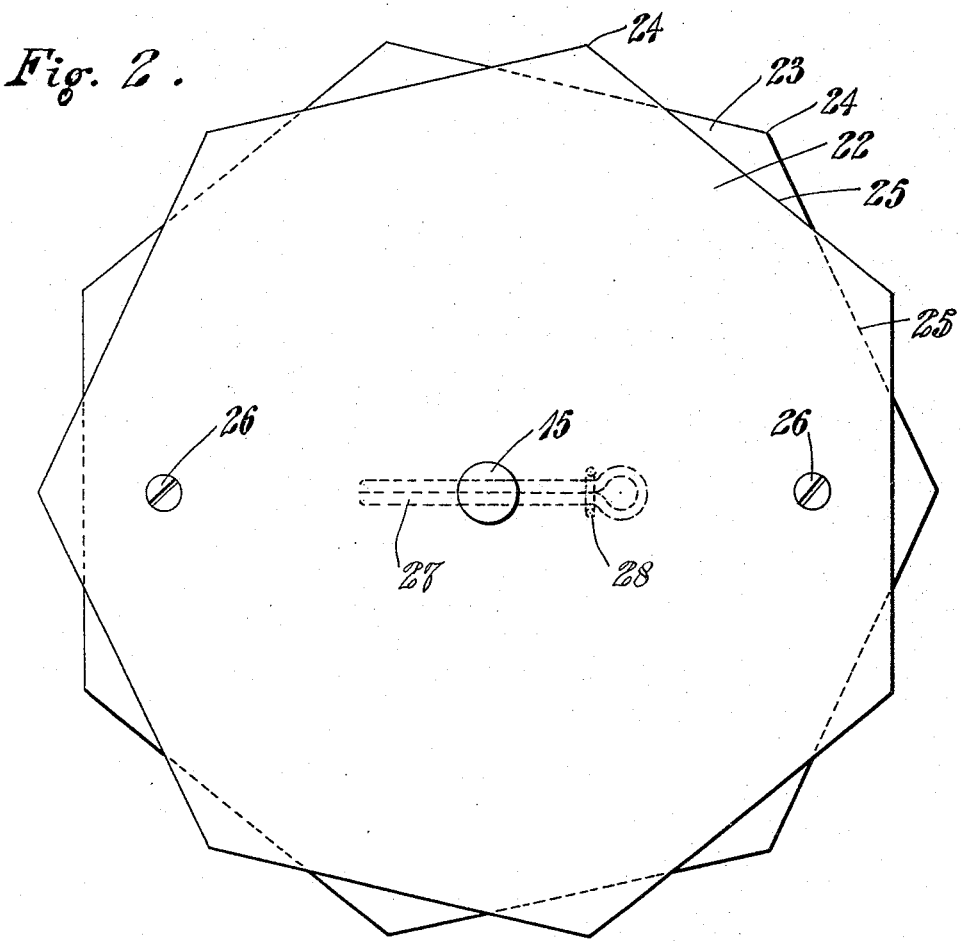

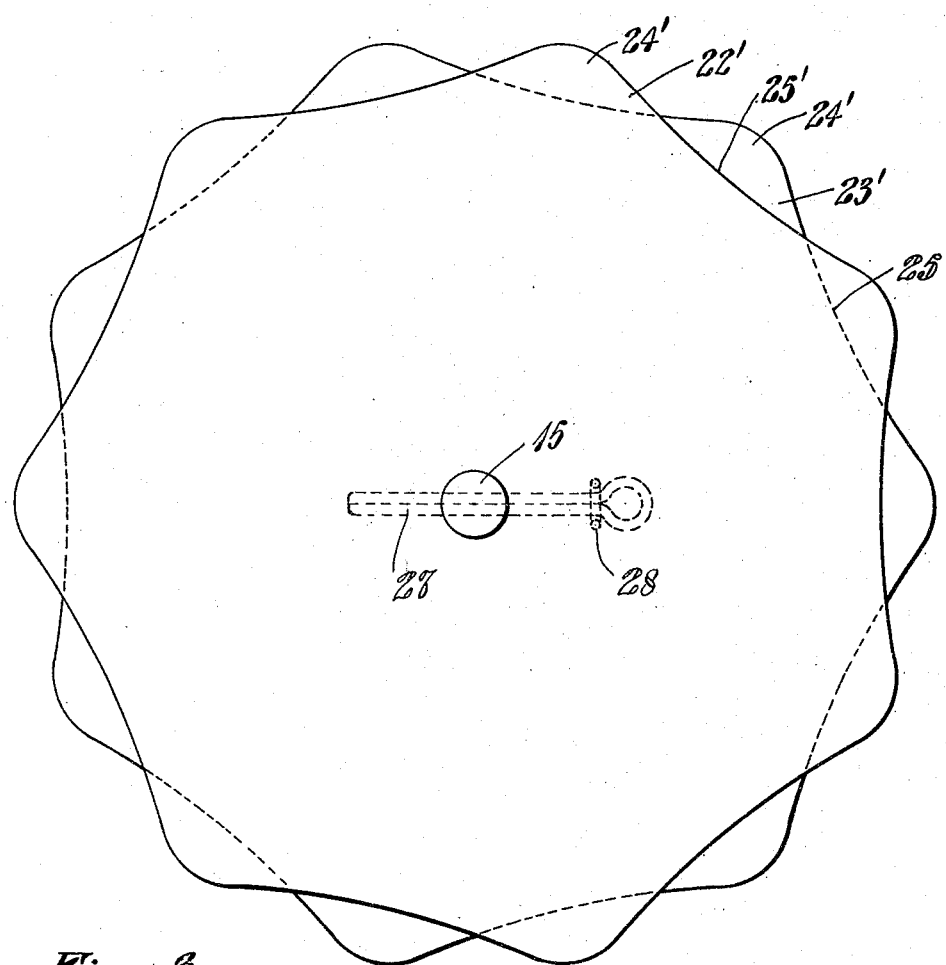

UNITED STATES PATENT OFFICE.

ALPHEUS FAY, OF LOUISVILLE, KENTUCKY.

APPARATUS FOR OPERATING UPON COMPOSITE SUBSTANCES.

1,177,939.  Specification of Letters Patent.  Patented Apr. 4, 1916.

Application filed August 30, 1915. Serial No. 48,056.

*To all whom it may concern:*

Be it known that I, ALPHEUS FAY, a citizen of the United States, residing at Louisville, in the county of Jefferson and State of Kentucky, have invented a new and useful Apparatus for Operating Upon Composite Substances, of which the following is a specification.

The object of my invention is to increase the efficiency of such operations as separating butter from milk or cream elements, or beating or mixing and combining elements.

A further object is to provide an apparatus for this purpose of simple and economical construction which will be simple to operate and easily kept clean and sanitary.

My invention consists in the apparatus and in the combination of parts thereof and in the details of construction and arrangement of said parts as will hereinafter be more fully described and claimed.

In the drawings: Figure 1 is a sectional perspective view of a device embodying my invention; Fig. 2 is a plan view of the impeller shown in Fig. 1; and Fig. 3 is a similar view of a modified impeller.

The vessel 1 is of wide and low formation, and the liquid placed therein preferably has its depth considerably less than the width of the vessel, in accordance with the method disclosed and claimed in my co-pending applications Serial No. 744,158, filed January 25, 1913; Serial No. 829,982, filed April 6, 1914; and Serial No. 11,355, filed March 1, 1915.

The bracket 2 is mounted across the top of the vessel resting on the rim thereof at opposite sides and having at one side a flat shank 3 that enters a cleat 4 fixed on the side of the vessel so that this end of the bracket 2 is held firmly down on the rim of the vessel. At the other side the bracket has a channel 5 fitting over the rim of the vessel and has, projecting outwardly, upwardly opening hooks 6. An arm 7 extends along the outside of the vessel, and its upper end has laterally projecting lugs 8 that engage in the upwardly opening hooks 6. This arm 7 at its bottom has a part 9 coming sufficiently far below the bottom of the vessel 1 to pass under the table or other object upon which the vessel is to be supported, and this terminal part 9 has a clamping screw 10 passing up through it to bear against the lower side of the top of the table or other object. With the shank end 3 of the bracket 2 fitting snugly under the cleat 4 and thus supporting and steadying this end of the bracket, and with the channel 5 fitting the rim of the vessel 1 snugly, it is thus possible to secure the bracket 2 firmly on the vessel 1 and at the same time secure the vessel firmly on the table or other object. This clamping means is disclosed and claimed in my co-pending application Serial No. 11.353, filed March 1, 1915. At the opposite side of the vessel a foot 11 may be fixed to the vessel near its bottom which may be engaged by an ordinary clamp 12 to hold the vessel down on the table or other supporting object at this side.

Immediately above the part of the bracket 2 that has the channel 5 and hooks 6 is an outwardly projecting bearing on which are journaled pulleys 13 each having two annular grooves in its periphery. On the lower part of the arm 7 a driving wheel 14 is rotatably mounted and it has two annular grooves in its periphery.

The shaft 15 is mounted vertically and extends down into the vessel having loose bearings 16 mounted in the middle of the bracket 2, above and below a pulley 17 having grooves 18 in its periphery and being fixed to said shaft 15 in any suitable manner. A single belt 19 passes around the two grooves of the fly wheel 14 and around the respective grooves 18 of the pulley 17 with two of its strands passing over the two grooves of one pulley 13 and its other two strands passing over the two grooves of the other pulley 13 at the side of the vessel. The loose bearings 16 are of spool shape, each having upper and lower flanges 20 which come above and below the bracket 2, and the parts of the bracket 2 are open at one side so that the middle or body part of this spool-shaped loose bearing 16 is adapted to fit in a substantially semi-circular vertical socket 21 in the bracket part on the side next to the driving wheel 14 and pulleys 13, said bearings 16 being held in their sockets by the tension of the driving belt 19. This tension is applied to the belt 19 in the process of assembling the apparatus and mounting it upon the table or other support. Thus it is necessary only to place the vessel upon the table, place the bracket upon the vessel, bring the shaft 15 with its loose bearings 16 into the sockets 21, then pass the driving belt 19 around the pulleys 17 and 18 and down over the pulleys 13 and then apply the arm 7 with the driving wheel 14 and pass the belt 19 around the driving wheel, whereupon the bringing of the arm 7 into clamping position will tighten the belt 19 properly, if it is made of the proper length, giving it the required tension to properly drive the shaft 15 and also to hold the bearing in its position in the bracket 2.

The impeller is preferably made up of two flat polygonal members 22 and 23 which are preferably flat wooden boards, the one superposed on the other in such relative position to each other that the corners or angles 24 of each member come about midway of the length of the flat sides 25 of the other member between the angles or corners 24. These members thus assembled are fastened together in any suitable manner, as by means of the screws 26. Centrally these members have an opening through them down through which extends the shaft 15; which shaft 15 has below the lower side of the impeller a transverse opening with a pin 27 therethrough held against endwise displacement by means of a steeple 28 passing up into the bottom of the impeller as indicated by the dotted lines in Figs. 1, 2 and 3. While two pieces are thus shown and described, it will be understood that a single piece of wood or other suitable material may have its periphery formed with the duplex series of angles and straight sides; and it will be understood that any other suitable means may be provided for fastening the impeller to the shaft; but preferably the fastening should be readily detachable so that all of the parts may be readily disassembled for cleaning as well as for packing and storing the apparatus.

To coöperate with the impeller, brakes 29 may be mounted at opposite sides of the interior of the vessel and may project up into suitable sockets in the lower side of the bracket 2 adjacent to respective sides of the rim of the vessel, and these brakes have their lower ends bearing firmly on the bottom of the vessel and thus are held in position for operation.

From the foregoing description it will be seen that the aparatus may be disassembled to such an extent that no large or cumbersome parts are left to be packed or stored. In fact with this construction, all of the parts may be conveniently packed inside the vessel 1 for storage or shipping, thus greatly adding to the convenience and economy of handling the device. Furthermore, the simple impeller and all other parts of the apparatus are readily accessible for cleaning, and the entire apparatus is thus readily kept sanitary in use. Thus arranged, when the impeller made up of the members 21 and 23 is rotated, the liquid in contact therewith is thrown horizontally along the plane upper and lower surfaces of the block outward in every direction, and is also thrown away from its duplex series of angles and sides. The centrifugal action along the plane surfaces of the members will cause a reduction of pressure on the liquid in the central region around the shaft 15 with the result that atmospheric air under atmospheric pressure will pass outwardly into the liquid in such central regions until it reaches the upper surfaces of the members where it will be carried outward along with the liquid that is being thrown outward by this centrifugal action. The frictional centrifugal action of the lower surfaces of the block keeps the region between this block and the bottom of the vessel clear of the solid matter that collects as a result of the operation, as for instance, the collection of the butter particles in separating butter from the other milk elements. The liquid thrown out by the lower surfaces of the block mingles in the region around the periphery of the block with the liquid thrown out by the upper surface of the block and with the air carried along by said liquid. The tendency of these currents of liquid and air is upward adjacent to the walls of the vessel and the brakes 29 will prevent simple whirling of the liquid in the vessel and so modify the direction of the liquid and air currents that a continuous smooth inflow and steady roll of the rarefied liquid will occur around the vessel.

Owing to the absence of impact by the impeller the nature of the liquid and air currents will be such that their contact with the brakes will not result in any violent agitation. On the contrary, the application of the forces to the liquid and air is so steady and smooth that an extremely uniform distribution of the forces and air throughout the body of the liquid is effected. This uniform aeration throughout the liquid is comparable to the uniform activity of a body of liquid undergoing a gentle boiling process caused by heat applied to the liquid. I have discovered that such a uniform distribution of the forces throughout a liquid produces true ebullition, without heat. This action, although familiar as obtained by the action of heat on a liquid, could not be utilized in the treating of milk elements to obtain butter were it necessary to apply heat to the liquid sufficient to boil. These divisions of the forces are made far more minute and numerous as well as effective by the duplex series of angles or serrations on the periphery of the impeller, and the nature of the action is decidedly different from that produced with the impeller merely polygonal as disclosed and claimed in my co-pending application Serial No. 11,352, filed March 1, 1915, inasmuch as a recession of the liquid during the passage of a flat side 25 of one member is accompanied by a throwing out of the liquid particles in an immediately adjacent region by one of the angles 24 of the other member of the impeller.

In the modification shown in Fig. 3, the members 22' and 23' have their angles or corners 24' somewhat rounded, and the sides 25' are made slightly concave so that the edge of each member is more truly serrated than are the edges of the members 22 and 23 in the preceding example. This results in still more smooth and harmonious action yet accompanied by the novel system of vibrations above described. It will be understood that this impeller may be made in one piece in the manner above described of wood or other suitable material.

In either example, as shown in Figs. 1 and 2, or as shown in Fig. 3, each series of angles, projecting parts or serrations is made seven in number; or where separate pieces are secured together each piece is preferably a seven-sided polygon, or has seven serrations around its periphery. While the number of serrations or projections afforded by the two series with seven in each one is best to produce a sufficiently rapid and at the same time sufficiently full vibration to effect the result hereinbefore set forth in apparatus of usual size and at usual rates of rotation of the driving means.

For separating cream, the milk is placed in the vessel, to a depth considerably less than its diameter, the agitator being about midway of the depth of the liquid thus placed in the vessel. The milk is then agitated by the centrifugal upward impelling action above described, inducing air currents throughout the body of the milk, thoroughly aerating the milk. The milk is preferably introduced at a temperature of from 40° to 50° F., while the air entering the milk is of atmospheric temperature, or about 60° to 70° F. After the milk has been agitated and aerated in the above manner for about five or ten minutes, the agitation is discontinued and the liquid allowed to rest for a few minutes during which the cream will rise on top. Then the skimmed milk is drawn off and the agitation may be resumed to churn the cream at a temperature of from 60° to 65° F. until the butter is separated from the cream, which will ordinarily require from three to five minutes. The butter will now be distinct from the residue divided into granular particles to approximate the particles of sugar. Water is added preferably at from 50° to 55° F., and the butter agitated and aerated in this body of cold water, thus washing the butter. For salting the butter a solution of substantially a pint of salt to a gallon of water at a temperature of from 50° to 55° F. is agitated with the granular butter preferably at reduced speed for about 30 to 60 seconds. On completion of the agitation of the granules and solution, the solution may be withdrawn, leaving that which has been incorporated with the granular mass, which, now thoroughly salted, with great homogeneity, is taken from the vessel and drained and worked to the proper useful consistency in any suitable and well known manner. The apparatus may be thoroughly cleaned after the operation, by disassemblage, as above described. If desired, the residue from churning and the skimmed milk that had been withdrawn after the separating operation may be placed together in the vessel, and the agitator again introduced, to thoroughly agitate and aerate the liquids, intimately mixing them, and producing a good serviceable fresh, sweet milk, with all the natural flavors of fresh sweet milk, and with all of its solids, except the butter fats.

To produce a high grade of buttermilk, the skimmed milk and the churning residue may be mixed and allowed to sour, before agitating and aerating, reaching the condition of clabber. Then, when agitated and aerated in the apparatus, a good quality of finely aerated buttermilk results. The above souring may also be effected with the use of the skimmed milk alone, allowing it to reach the condition of clabber, and then agitating it and aerating it. Such treatment of skimmed milk alone is of advantage when the cream therefrom has not been used for making butter, leaving no residue for mixing with the skimmed milk.

A poor quality of butter may be operated upon, to improve it, by the use of my invention, placing such butter in a suitable amount of pure water in the vessel and agitating it and aerating it in the above described manner, but at a temperature of not more than 50° or 60° F. The butter may be granulated to permit a most efficient purifying action of the air thereon, and of the water, which may be withdrawn and fresh water supplied, as required. The neutral granules may then be removed and salted and worked and otherwise treated according to good practice in the production and marketing of palatable fresh butter, with which it is identical. Furthermore, if desired, the butter granules above alluded to may be mixed with sweet milk to produce a high quality of cream of any desired percentage of fatty constituents, thoroughly fresh, sweet and pure, and adaptable for all the purposes that good cream is used for. This combined aeration and agitation will produce a fine quality of whipped cream from a cream of comparatively low percentage of butter fats, with an operation of only from three to five minutes.

My apparatus is well adapted for producing homogenized dairy products, as preparations to be used as butter, or as oleomargarin, or as butterin.

I have set forth the above processes to illustrate the use of my apparatus, and it will be understood that other advantageous uses will be suggested in the employment of my invention, and divers minor modifications may occur in such adaptation.

Having fully described my invention, what I claim as new and desire to secure by Letters Patent is:

1. In a device of the character described, in combination with a vessel, an impeller having a plane top and a plane bottom, and a duplex series of alternately projecting and receding parts around its periphery, each projecting part of each series being within the extent of a receding part of the other series, and means for rotating said impeller on an axis substantially central of said periphery and substantially at right angles to said plane top and bottom, while said impeller is submerged in a substance in said vessel.

2. In a device of the character described, in combination with a vessel, an impeller having a plane top and a plane bottom, and a duplex series of serrations around its periphery, the serrations of each series being out of coincidence with those of the other series, and means for rotating said impeller on an axis substantially central of said periphery and substantially at right angles to said plane top and bottom, while said impeller is submerged in a substance in said vessel.

3. In a device of the character described, a substantially solid impeller having distinct series of alternately receding and projecting parts around its periphery, with each projecting part of each series substantially midway of a receding part of the other series, and means for rotating the impeller thus made up on an axis substantially central of the periphery of the members, with said impeller submerged in a substance in said vessel.

4. In a device of the character described, a solid impeller having distinct series of alternately receding and projecting parts around its periphery with each projecting part of one member substantially midway of a receding part of the other member, and means for rotating the impeller thus made up on an axis substantially central of the periphery of the members, with said impeller submerged in a substance in said vessel, the diameter of said impeller being greater than its thickness.

5. In a device of the character described, a solid impeller having distinct series of alternately receding and projecting parts around its periphery with each projecting part of each series substantially midway of the receding part of the other series, and means for rotating the impeller thus made up on an axis substantially central of its periphery, with said impeller submerged in a substance in said vessel, the diameter of said impeller being at least four times its thickness.

6. In a device of the character described, an impeller made up of two flat members, each having a series of alternately receding and projecting parts around its periphery and secured together with each projecting part of each member substantially midway of a receding part of the other member, and means for rotating the impeller thus made up on an axis substantially central of its periphery and substantially at right angles to the flat surfaces of the members, with said impeller submerged in a substance in said vessel.

7. In a device of the character described, an impeller made up of two flat members with serrated edges, and secured together with the serrations of one member out of coincidence with the serrations of the other member, and means for rotating the impeller thus made up on an axis substantially central of the periphery of the members and substantially at right angles to the flat surfaces of the members with said impeller submerged in a substance in said vessel.

8. In a device of the character described, an impeller made up of two solid members each having a series of alternately receding and projecting parts around its periphery and secured together with each projecting part of each member substantially midway of a receding part of the other member, and means for rotating the impeller thus made up on an axis substantially central of its periphery, with said impeller submerged in a substance in said vessel.

9. In a device of the character described, in combination with a vessel, an impeller having a duplex series of alternately projecting and receding parts around its periphery, each series comprising seven such parts, and each projecting part of each series being within the extent of a receding part of the other series, and means for rotating said impeller on an axis substantially central of said periphery while said impeller is submerged in a substance in said vessel.

10. In a device of the character described, in combination with a vessel, an impeller having a duplex series of serrations around its periphery, each series comprising seven such serrations, and the serrations of each series being out of coincidence with those of the other series, and means for rotating said impeller on an axis substantially central of said periphery while said impeller is submerged in a substance in said vessel.

11. In a device of the character described, an impeller made up of two flat members, each having seven alternately receding and projecting parts around its periphery and secured together with each projecting part of each member substantially midway of a receding part of the other member, and means for rotating the impeller thus made up on an axis substantially central of its periphery and substantially at right angles to the flat surfaces of the members, with said impeller submerged in a substance in said vessel.

ALPHEUS FAY.

Witnesses:
 CLARENCE PERDEW,
 IRENE PARKER.

Copies of this patent may be obtained for five cents each, by addressing the "Commissioner of Patents, Washington, D. C."